(12) United States Patent
Johansson

(10) Patent No.: US 8,755,950 B2
(45) Date of Patent: Jun. 17, 2014

(54) SAFE TERMINATION OF UAV

(75) Inventor: Rikard Johansson, Linköping (SE)

(73) Assignee: Saab AB, Linköping (SE)

( * ) Notice: Subject to any disclaimer, the term of this patent is extended or adjusted under 35 U.S.C. 154(b) by 680 days.

(21) Appl. No.: 13/058,105

(22) PCT Filed: Aug. 6, 2009

(86) PCT No.: PCT/SE2009/050920
§ 371 (c)(1),
(2), (4) Date: Apr. 28, 2011

(87) PCT Pub. No.: WO2010/016796
PCT Pub. Date: Feb. 11, 2010

(65) Prior Publication Data
US 2011/0202203 A1 Aug. 18, 2011

(30) Foreign Application Priority Data
Aug. 8, 2008 (EP) .................................... 08162084

(51) Int. Cl.
*G06F 17/00* (2006.01)
*G06F 19/00* (2011.01)
*G01M 17/00* (2006.01)

(52) U.S. Cl.
USPC ............... 701/2; 701/99; 701/29.2; 701/32.6; 340/963

(58) Field of Classification Search
USPC ........... 701/1, 2, 3, 11, 13, 14, 23, 24, 36, 41, 701/45, 47, 99, 107, 120–123, 29.1, 29.2, 701/29.3, 29.6, 29.7, 29.8, 30.2, 30.3, 30.4, 701/30.5, 31.2, 31.3, 31.4, 31.5, 32.6, 32.9, 701/33.7, 34.1, 34.4; 340/870.07, 945, 946, 340/963, 971

See application file for complete search history.

(56) References Cited

U.S. PATENT DOCUMENTS 6,232,884 B1 * 5/2001 Gabbard .................... 340/12.27
6,377,875 B1    4/2002 Schwaerzler (Continued)

FOREIGN PATENT DOCUMENTS

EP   0459781 A1   12/1991
EP   1339189 A2   8/2003

(Continued)

OTHER PUBLICATIONS

PCT/ISA/210—International Search Report—Oct. 26, 2009.

(Continued)

*Primary Examiner* — Thomas Tarcza
*Assistant Examiner* — Edward Pipala
(74) *Attorney, Agent, or Firm* — Venable LLP; Eric J. Franklin

(57) ABSTRACT

A termination system that transmits on a cyclic basis, from a control station to an unmanned vehicle, pairs of mutually dependent code and counter values whose dependency is determined by a termination algorithm. The vehicle has knowledge of the algorithm and can hence validate a received code/counter pair using the same algorithm. If the received code/counter pair is invalid, the vehicle can decide to self-terminate. The control station includes a termination actuator that allows the vehicle to be remotely terminated by invalidating, when actuated by an operator, the code/counter pairs that are transmitted to the vehicle.

14 Claims, 7 Drawing Sheets

(56) References Cited

U.S. PATENT DOCUMENTS

2002/0163418 A1 11/2002 Nemoto
2003/0129949 A1 7/2003 Selektor
2007/0279184 A1 12/2007 Desai et al.

FOREIGN PATENT DOCUMENTS

EP 1462898 A2 9/2004
FR 2 912 022 A1 8/2008
WO WO-2008/135996 A2 11/2008

OTHER PUBLICATIONS

PCT/ISA/237—Written Opinion of the International Searching Authority—Oct. 26, 2009.
European Search Report—Jan. 14, 2009.
Communication from the European Patent Office, dated Apr. 21, 2011, issued in connection with counterpart European Patent Appliation No. 08 162 084.1.

* cited by examiner

SAFE TERMINATION OF UAV

CROSS-REFERENCE TO RELATED APPLICATIONS

This application claims priority under 35 U.S.C. §119 to European patent application 08162084.1 filed 8 Aug. 2008 and is the national phase under 35 U.S.C. §371 of PCT/SE2009/050920 filed 6 Aug. 2009.

TECHNICAL FIELD

The present invention relates to the field of unmanned vehicles, such as unmanned aerial vehicles (UAVs), and more particularly to a method and a system for allowing an unmanned vehicle to be terminated in a safe and cost efficient manner.

BACKGROUND ART

Unmanned aerial vehicles (UAVs) are often restricted to operate in empty airspace where there is no risk of mid-air collisions with manned aircrafts, and in geographical areas where a potential crash-landing would not cause any human casualties and cause minimal infrastructural and environmental damage. Operational area restrictions are normally set out by governmental and/or international border requirements, regulations and laws.

When a UAV escapes or is about to escape from its permitted operational area due to system malfunction, or upon detection of unsafe conditions within its permitted operational area, it is of great importance that the UAV can be remotely terminated, for example by shutting down the UAV engine. Although operating more or less autonomously, a UAV is typically connected to a UAV control station (UCS) from which an operator can terminate the UAV remotely by overriding its autonomous control system.

The requirements on the termination system allowing an operator to remotely terminate a UAV are rigorous. The termination system should be designed to avoid that the UAV is terminated without due cause but, most important, it must be extremely reliable such that termination of the UAV always is possible when the need arises.

In addition, it is important to minimize the weight and size of the components constituting the termination system. This is particularly important as regards the part of the termination system that is located in the UAV since an increase in UAV size and/or weight typically increases fuel consumption and/or deteriorates the UAV flying capacity. It is also of great importance that the termination system is equipped to withstand hostile takeovers to prevent intervening parties from transmitting UAV termination commands with malicious intent. Another aspect that should be taken into consideration

SUMMARY

It is an object of the present invention to provide a termination system allowing an unmanned vehicle to be remotely terminated in a safe and cost efficient manner.

This object is achieved by a termination system for remote termination of an unmanned vehicle communicatively connected to an unmanned vehicle control station via an air interface. The termination system comprises two parts; a control station portion that is located in the control station and a vehicle portion that is located in the unmanned vehicle. The control station portion of the termination system comprises:

a control station computer comprising means adapted to generate, on a cyclic basis, different counter values;

a termination device adapted to generate, in each cycle, a control station code [CS code] by running a counter value through a termination algorithm;

transmitting means adapted to transmit, in each cycle, the counter value and the CS code generated from that counter value to the unmanned vehicle in form of a counter value/CS code pair, via said air interface, and a termination actuator which, when actuated, is adapted to prevent counter value/CS code pairs in which the CS code has been generated from the counter value from being transmitted to the unmanned vehicle, while the vehicle portion of the termination system comprises:

receiving means adapted to receive the counter value/CS code pair transmitted from the control station in each cycle; and an unmanned vehicle computer connected to said receiving means and adapted to:

generate an unmanned vehicle code [UV code] by running the counter value in the received counter value/CS code pair through a termination algorithm corresponding to the algorithm used to generate the CS code in the control station, and compare the CS code in the received counter value/CS code pair with said generated UV code to establish whether they differ from each other, in which case a termination event of the type code termination event has occurred, and termination decision means for deciding whether or not to terminate the unmanned vehicle based on the occurrence of any termination events.

The present invention hence provides a termination system based on the principle to transmit on a cyclic basis, from a control station to an unmanned vehicle, pairs of mutually dependent code and counter values whose dependency is determined by a termination algorithm. The vehicle has knowledge of the algorithm and can hence validate a received code/counter pair using the same algorithm. If the received code/counter pair is invalid, the vehicle can decide to self-terminate. The termination actuator allows the vehicle to be safely terminated from the control station by invalidating, when actuated by an operator, the code/counter pairs that are transmitted to the vehicle.

Transmission of valid code/counter pairs can hence be regarded as transmission of do-not-terminate commands to the unmanned vehicle, instructing the vehicle not to self-terminate.

An advantage of terminating the unmanned vehicle by preventing do-not-terminate commands to be transmitted to the vehicle, as opposed to by actively transmitting a termination command instructing the vehicle to self-terminate, is that the unmanned vehicle will terminate also in the event of a control station malfunction preventing the intended signal to be transmitted to the vehicle. Thereby, a control station malfunction will not lead to a situation in which the unmanned vehicle cannot be terminated, potentially allowing the vehicle to escape from its permitted operational area. This is advantageous in that a scenario in which an unmanned vehicle escapes from its permitted operational area is far worse, from a safety point of view, than a scenario in which an unmanned vehicle is terminated within its permitted operational area.

An advantage of using do-not-terminate commands in form of mutually dependent code and counter values is that it is highly unlikely that the control station, due to a software or hardware fault, will be able to prevent termination of the vehicle by inadvertently sending valid counter/code pairs to the vehicle.

Preferably, the unmanned vehicle computer is further adapted to store, at least temporarily, any of the counter value parameter, the CS code parameter, or the UV code parameter, and to compare any of said parameters with at least one parameter of the same type, stored during at least one previous cycle, to see whether they differ from each other. If they do not differ from each other, i.e. if the parameter value remains unchanged between the cycles, a termination event of the type "constant parameter termination event" has occurred, indicating that the termination system is not functioning properly. In this case, the termination decision means of the unmanned vehicle decides whether or not to terminate the vehicle not only based on the occurrence of code termination events, but also based on the occurrence of constant parameter termination events.

This feature is advantageous in that it makes the termination system less prone to infinite loops. Also, without this feature, a third party that is able to get hold of a valid counter value/CS code pair, by for example eavesdropping on the communication link between the control station and the vehicle, may be able to prohibit termination of the vehicle from the control station by repeatedly transmitting this sole counter value/CS code pair to the vehicle. Thus, this feature makes the termination system less vulnerable to third-party vehicle takeover attempts.

According to one embodiment of the invention, the vehicle portion of the termination system further comprises a vehicle termination device (VTD) which is a stand-alone unit externally connected to the vehicle computer. In this embodiment, the vehicle computer is further adapted to, if no code termination event or constant parameter termination event occurs during a cycle, generate a do-not-terminate command in form of one or several signals having predetermined characteristics or carrying predetermined information content, and transmit the signals to the VTD. The characteristics or information content of the signals should be sufficiently complex for making it unlikely that a random process in the vehicle computer would generate such signals by chance. The VTD is in turn adapted to analyze the received signals to see whether they fulfil certain predetermined conditions, which they do if they have the predetermined characteristics or carries the predetermined information content. If no signals fulfilling the conditions are received by the VTD during a cycle, a termination event called "TF test termination event" has occurred. In this case, the termination decision means of the unmanned vehicle decides whether or not to terminate the vehicle based on the occurrence of such TF test termination events.

The actual termination of the unmanned vehicle is effectuated by a non-intelligent termination execution device (TED) that is adapted to set a component of the vehicle system, such as a fuel valve or the engine ignition, in a state in which repulsion of the vehicle is rendered impossible, e.g. by quenching the fuel supply to the vehicle engine or switching off the engine ignition. When no VTD is used, the vehicle computer must send a termination command to the TED instructing it to terminate the vehicle upon detection of one or several termination events. This is associated with a safety-risk as the event of a vehicle computer malfunction could render impossible transmission of a termination command to the TED, thus making it impossible to terminate the vehicle.

However, by using a VTD interconnecting the vehicle computer and the non-intelligent TED, and adapting the VTD to send a termination command to the TED when not receiving do-not-termination commands from the vehicle computer, this problem is solved. Thus, the VTD increases the safety of the termination system by ensuring that the vehicle can be terminated also if the vehicle computer starts malfunctioning.

Another advantage achieved by the VTD-solution described above is that the vehicle computer does not have to be built from safety-critical software and hardware components, since the vehicle can be terminated even if the computer crashes. Thus, in a termination system using a VTD, both the control station computer and the unmanned vehicle computer can be conventional off-the-shelf computers running commercial-off-the-shelf (COTS) software, thus greatly reducing the cost of the termination system as compared to termination systems using computers in which the hardware and software components must be classified to a high criticality level.

Other advantageous embodiments of the termination system will be described in the detailed description of the invention following hereinafter.

The invention also relates to an unmanned vehicle control station comprising a control station portion of the above described termination system, and an unmanned vehicle comprising a vehicle portion of the above described termination system.

It is another object of the invention to provide a method for deciding whether an unmanned vehicle, such as an unmanned aerial vehicle (UAV), should be terminated or not.

This object is achieved by a method for deciding whether or not to terminate an unmanned vehicle that is communicatively connected to an unmanned vehicle control station via an air interface. The decision is based on the occurrence of one or a plurality of termination events, which termination event(s) can be any of one or several types. The method includes generating mutually dependent code and counter values by performing, on a cyclic basis, the following steps in the control station:

generating a counter value;
generating a control station code [CS code] by running said counter value through a termination algorithm; and
transmitting, over the air interface (9), said counter value and said CS code to the unmanned vehicle;

and deciding whether or not to terminate the vehicle (5) based on information received over the air interface (9) by performing, for each cycle, the following steps in the unmanned vehicle (5):

receiving said counter value and said CS code;
generating an unmanned vehicle code [UV code] by running said received counter value through a termination algorithm corresponding to the termination algorithm used to generate the CS code in the control station;
comparing said received CS code with said generated UV code to establish whether they differ from each other, in which case a termination event of the type code termination event has occurred; and
deciding whether or not to terminate the unmanned vehicle based on the occurrence of any termination events.

The above method ensures that the unmanned vehicle can decide to self-terminate in case valid counter value/CS code pairs are not received from the control station. The method hence allows for an unmanned vehicle to be remotely terminated in a safe and cost efficient manner by intentionally preventing valid counter value/CS code pairs to be transmitted to the vehicle, while at the same time ensuring that the vehicle is self-terminated in the event of a control station malfunction.

The invention also relates to a method for generating a mutually dependent code and counter value in an unmanned vehicle control station, and a method for deciding whether an unmanned vehicle that is communicatively connected to an unmanned vehicle control station via an air interface should be terminated or not based on information received by the vehicle over the air interface.

BRIEF DESCRIPTION OF THE DRAWINGS AND TABLES

The present invention will become more fully understood from the detailed description provided hereinafter and the accompanying drawings, in which similar reference numbers in different drawings refer to similar components, of which:

ACRONYMS AND ABBREVIATIONS

| Acronym | Definition |
| --- | --- |
| APIC | Advanced Programmable Interrupt Controller |
| COTS software | commercial-off-the-shelf software |
| CS | Control Station |
| FPGA | Field-Programmable Gate Array |
| IMR | Interrupt Mask Register |
| PIC | Programmable Interrupt Controller |
| TED | Termination Execution Device |
| TF | Termination Function |
| TSU cycle | Termination System Update cycle |
| UAV | Unmanned Aerial Vehicle |
| UAV CTF | UAV Computer Termination Function |
| UCS | UAV Control Station |
| UTD | UCS Termination Device |
| UV | Unmanned Vehicle |
| VCS | Vehicle Control System |
| VTD | Vehicle Termination Device |

DETAILED DESCRIPTION

Figure 1:
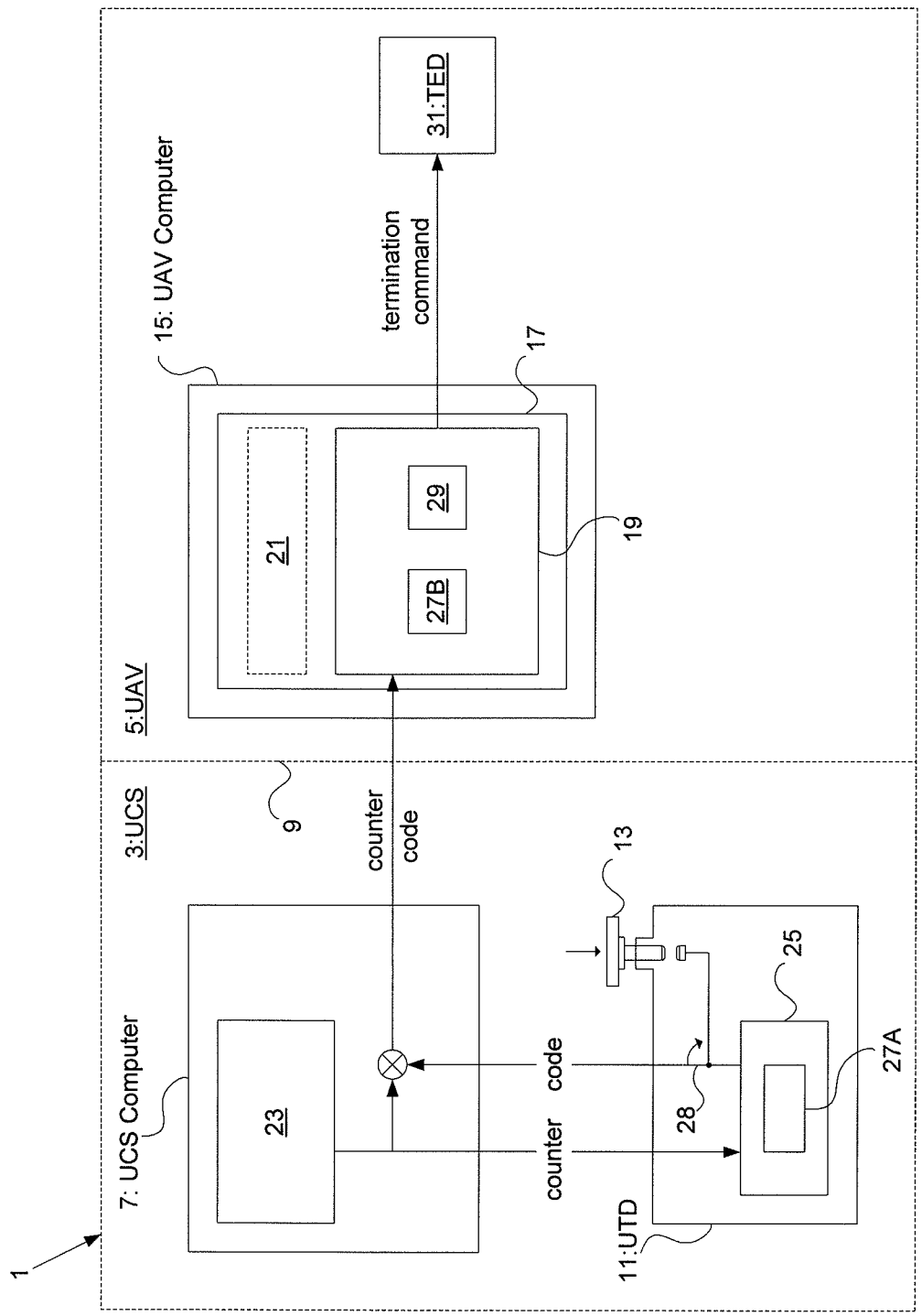
FIG. 1 illustrates a first embodiment of a UAV termination system for remote termination of Unmanned Aerial Vehicles (UAVs) according to the invention.

FIG. 1 illustrates an embodiment of a termination system 1 for remote termination of unmanned vehicles according to the invention. Although the termination system 1 can be used for termination of any type of unmanned vehicle, it will hereinafter be described in the context of an unmanned aerial vehicle (UAV).

The termination system 1 comprises two parts; one control station portion that is located in a UAV Control Station (UCS) 3, and one vehicle portion that is located in a UAV 5. The UCS 3 is typically located on ground but may also be located in, e.g., an aircraft or a ship escorting the UAV 5 at a distance. The UCS 3 comprises one or several interconnected computers 7 through which one or several operators remotely can monitor and/or control the operation of the UAV 5 with which the UCS 3 is associated. The UCS computer 7 is typically a conventional off-the-shelf computer.

The UCS computer 7 is communicatively connected to the UAV 5 via an air interface, illustrated here by the dashed line 9 separating the components of the UCS 3 from the components of the UAV 5. The air interface 9 is typically but not necessarily a radio-based communication link.

The UCS computer 7 is further connected to a UCS termination device (UTD) 11 for enabling an operator to remotely terminate the UAV 5 by activating a termination actuator, such as for example a push button 13.

The UAV 5 includes at least one onboard computer 15 that comprises functionality for controlling the operation of the UAV based on pre-programmed instructions and/or instructions received from the UCS 3 over the air interface 9. The UAV computer 15 comprises processing means 17, such as a micro processor, for running various applications/functions related to the operation of the UAV 5. One of the most safety-critical functions of the onboard computer 15 is the termination function allowing an operator to terminate the UAV 5 from the remote UCS 3. The termination function/application is illustrated as a functional module denoted by reference numeral 19 in the drawing. This function will be described in more detail below. The UAV computer 15 also comprises other functionality, here illustrated by a functional module denoted with reference numeral 21. Typically, this functional module 21 comprises at least a UAV control function for flight-control, and a sensor and payload control function for controlling the onboard sensors and payload.

In the following, the components of the UAV termination system 1 and their respective functionality during normal use will be described in more detail. The term "normal use" should in this context be construed as use of the UAV termination system 1 when no intentional termination of the UAV has been initiated and when the system 1 operates accurately.

The UCS computer 7 comprises a counter 23 which, at given time intervals, generates counter values which are transmitted to the UTD 11. The UTD 11 in turn comprises processing means 25, such as a micro processor, adapted to execute a termination algorithm 27 each time a counter value is received from the UCS computer 7. Each time it is executed, the termination algorithm 27 uses the received counter value as input parameter and generates a code whose value is dependent on the particular algorithm used and the input counter value. This code, which hereinafter will be referred to as the control station (CS) code, is then returned to the UCS computer 7. Preferably, the termination algorithm 27 is chosen such that each unique counter value used as input parameter to the algorithm results in a unique code. Furthermore, the termination algorithm 27 is preferably sufficiently complex to render impossible for any third party intercepting a counter value and its corresponding code to figure out what algorithm is used.

When the UCS computer 7 receives the CS code, both the CS code and the counter value used to calculate that particular CS code are forwarded to UCS transceiver circuitry (not shown) for further transmission to the UAV over the air interface 9, typically by means of modulated radio signals.

When a counter value/CS code pair is received by UAV transceiver circuitry (not shown), they are provided to the termination function 19 in the UAV computer 15. The termination function 19 includes a termination algorithm 27B corresponding to the termination algorithm 27A in the UCS UTD 11, and a code verification function 29. The counter value received from the UCS 3 is provided as input parameter to the termination algorithm 27B while the code received from the UCS 3, i.e. each CS code, is provided to the code verification function 29. In accordance with the previously described termination algorithm 27A in the UCS UTD 11, the termination algorithm 27B generates a code whose value is dependent on the particular mathematical algorithm used, and the input counter value. The codes generated by the termination algorithms 27B in the UAV will hereinafter be referred to as unmanned vehicle (UV) codes. After being generated by the termination algorithm 27B, the UV code is provided to the code verification function 29.

The code verification function 29 is adapted to compare the CS code with the UV code to establish whether they equal each other. Since the termination algorithm 27A in the UCS UTD 11 and the termination algorithm 27B in the UAV are the same, and since the same counter value is used as input parameters to both algorithms 27A, 27B, the CS and UV codes should, in normal use of the UAV termination system 1, be equal to each other.

The detection of non-equality between a CS code and a UV code is an example of an event which in this document will be referred to as a termination event. A termination event should, in this context, be construed as an event which, when occurring in the termination system 1, indicates either that the termination system 1 is not functioning properly, or that a UCS operator has actuated the termination device 13 of the UTD 11. The particular type of termination event corresponding to a mismatch between a CS code and a UV code is herein called code termination event.

Termination of the UAV 5 is effectuated by sending a termination command to a termination execution device (TED) 31 in the UAV system upon detection of an occurrence or repeated occurrences of a termination event, such as a code termination event. The TED 31 is a non-intelligent device adapted to terminate the UAV upon reception of such a termination command, typically by simply shutting the vehicle down. Typically, the TED 31 is connected to a relay for switching off the UAV engine ignition, a stop valve for quenching the fuel supply to the UAV engine, or any other component of the vehicle system which can be set in a state in which propulsion of the vehicle is rendered impossible. That is, termination of the UAV 5 is hence typically executed by the TED 31 by switching of the UAV engine ignition or quenching the fuel supply to the UAV engine. In the embodiment of the termination system 1 illustrated in FIG. 1, the code verification function 29 is adapted to send a termination command to the TED 31 if the CS and UV codes differ from each other in one or a plurality of consecutive comparisons, and the TED 31 is adapted to terminate the UAV 5 upon reception of such a termination command.

As aforementioned, the counter 23 of the UCS computer 7 is arranged to generate the counter values at given time intervals. For example, the counter 23 may be adapted to generate ten counter values per second. This gives the UAV termination system 1 an updating frequency of 10 Hz, meaning that the entire termination system update (TSU) cycle starting with the generation of the counter code in the UCS computer 7 and ending with the decision as to whether or not the UAV should be terminated is repeated ten times each second. In this embodiment, the code verification function 29 is typically adapted to send a termination command to the TED 31 not only upon detection of an invalid counter value/CS code pair, but also when no counter value/CS code pair is received by the UAV 5 in one or a plurality of consecutive TSU cycles, indicating that the connection between the UCS 3 and the UAV 5 is lost.

In the following, the function of the UAV termination system 1 upon remote, manual termination of the UAV will be described in more detail.

The termination actuator 13 of the UTD 11 is adapted, when actuated by an operator at the UCS site, to prevent the transmission of valid CS code/counter pairs to the UAV 5. As illustrated in FIG. 1, this can be achieved by physically disconnecting the UTD 11 from the UCS computer 7 when activating the termination actuator 13. The disconnection between the UTD 11 and the UCS computer 7 is, in this exemplary embodiment, effectuated by means of a switch 28 which is disengaged when pressing the push button 13. The disengagement of the switch 28 prevents the calculated CS codes from ever being returned to the UCS computer 7. This has the effect that, depending on the program code in the UCS computer 7, either a CS code having a NULL value or a CS code having a random value is transmitted to the UAV 5, which in turn has the effect that the UV code which is subsequently generated by the UAV termination function 19 will differ from the CS code. Thus, activation of the termination actuator 13 of the UTD 11 causes a code termination event to occur in the termination system 1, which code termination event will occur in each TSU cycle until the termination actuator 13 is deactivated. In this embodiment, the so induced termination events will cause the code verification function 29 to send a termination command to the TED 31, which in turn causes the TED 31 to terminate the UAV 5. Preferably, the UTD 11 is a stand-alone unit that is externally connected to the UCS computer 7. This has the advantage that the counter values and/or CS codes always can be prevented from being sent between the UTD 11 and the computer 7 even if the push button 13 or the switch 28 jams or malfunctions, e.g. by pulling the plug or even cutting the wire(s) connecting them.

The switch 28 may also be located in the signalling path over which the counter value is transmitted to the UTD 11. Also, although illustrated as two separate signalling paths in the drawing, the counter values and the codes may be transmitted between the UCS computer 7 and the UTD 11 via one single signalling path in which the switch 28 may be arranged to interrupt exchange of counter values/codes between the UCS computer 7 and the UTD 11 upon activation of the termination actuator 13. A skilled person will understand that disconnection between the UTD 11 and the UCS computer 7 can be effectuated in many other ways than by means of an electrical switch, e.g. by simply pulling the plugs between the two units 7, 11. No matter how the possibility of disconnecting the UTD 11 from the UCS 7 is implemented in the UAV termination system 1, the disconnection should render impossible for the UCS computer 7 to obtain a valid code for a particular counter value, thereby preventing a valid CS code/counter pair to be transmitted from the UCS 3 to the UAV 5.

A skilled person will also understand that the values used as input parameters to the termination algorithms 27A, 27B do not necessarily have to be counter generated values. The counter 23 in the UCS computer 7 may be exchanged for, e.g., a random number or text string generator which periodically generates random values which can be used as algorithm input values in the same way the counter generated values are used in the above description of the UAV termination system 1. Although, the term "counter value" will be used also in the following, it should hence be construed as covering any information suitable for use as input parameters to the termination algorithms 27A and 27B, including e.g. random numeric values and random text string values.

An advantage of the UAV termination system 1 is that a situation in which it is impossible to terminate the UAV 5 is very unlikely to occur, thus making it highly unlikely that an UCS operator will not be able to prevent the UAV 5 from escaping from its permitted operational area even in case of system malfunction.

This is due to the fact that the UAV termination system 1 is designed such that any malfunctioning of a UCS hardware or software component that is vital to the possibility of manually terminating the UAV 5 will result in automatic self-termination of the UAV 5. If, for example, the UTD 11, the UCS computer 7, or the UCS radio transceiver circuitry starts malfunctioning, valid counter/code pairs will not be transmitted to the UAV computer 15 which will cause termination events to occur and hence cause the TED 31 to terminate the UAV 5. It should also be noted that it is highly unlikely that the UCS 3, due to a software or hardware fault, will be able to prevent UAV termination by inadvertently sending correct counter/code pairs to the UAV 5. That is, the present invention provides a UAV termination system 1 with automatic function control causing the UAV to self-terminate in case of UCS malfunction.

Figure 2:
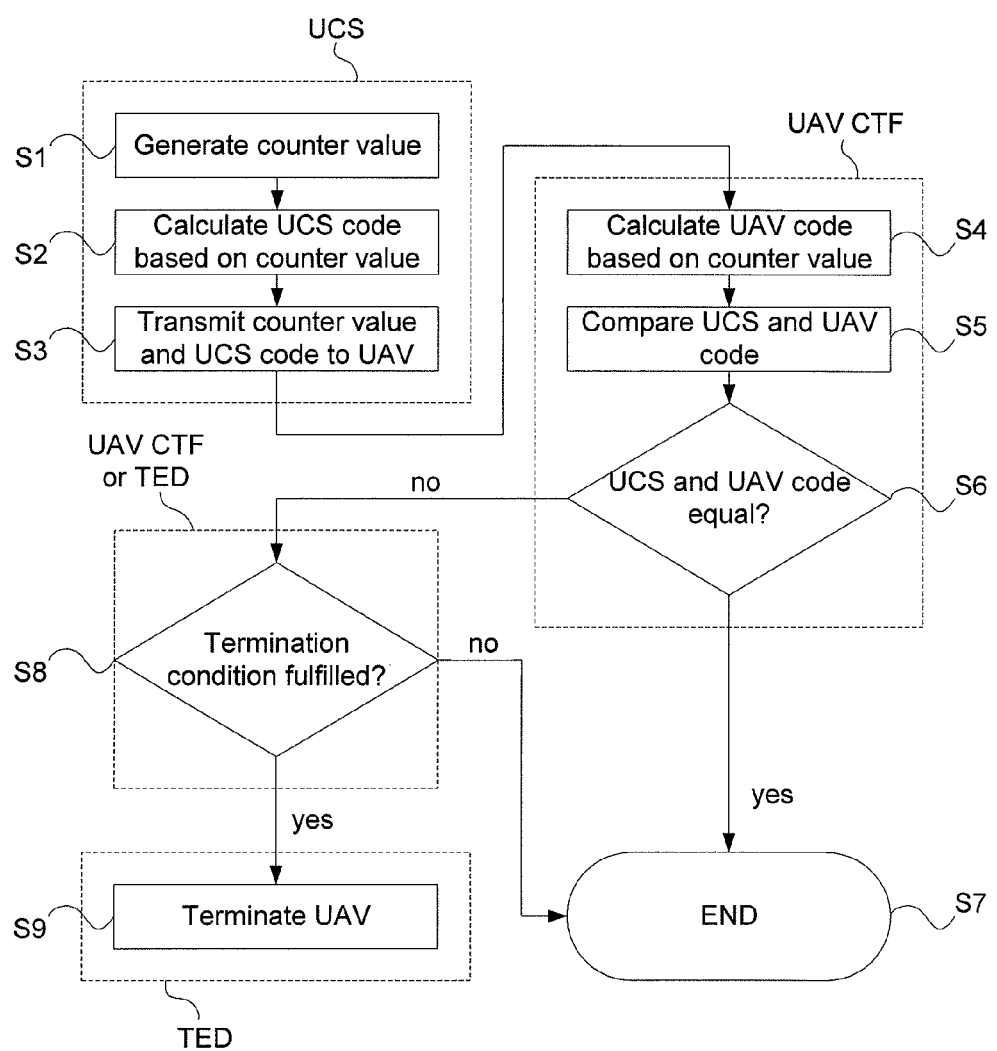
FIG. 2 shows a flow chart illustrating a method according to the invention for determining whether a UAV should be terminated or not.

FIG. 2 shows a flow chart illustrating a method according to the invention for determining whether a UAV should be terminated or not. The flow chart illustrates the method steps performed during each TSU cycle.

In a first step S1, a counter value is generated by a UCS computer 7. The counter value is then sent to a UTD 11 of the UCS 3, whereupon the method proceeds to step S2.

In step S2, the UTD 11 generates a first code (the CS code) by running the counter value received from the UCS computer 7 through a termination algorithm 27A. The generated CS code is sent back to the UCS computer 7, whereupon the method proceeds to step S3.

In step S3, the counter value and the CS code generated from that counter value are transmitted from the UCS computer 7 to the UAV 5 over an air interface 9, whereupon the method proceeds to step S4.

In step S4, the UAV computer termination function 19 generates a second code (the UV code) by running the counter value received from the UCS computer 7 through a UAV termination algorithm 27B corresponding to the UCS algorithm 27A. The method then proceeds to step S5.

In step S5, the UAV computer termination function 19 compares the CS code received from the UCS computer 7 and the UV code generated by the UAV termination algorithm 27B, whereupon the method proceeds to step S6.

In step S6, the UAV computer termination function 19 establishes whether the CS code received from the UCS computer 7 and hence generated by the UCS termination algorithm 27A in step S2 equals the UV code generated by the UAV termination algorithm 27B in step S4. If the CS and UV codes are the same, the method ends in a step S7. If, however, the CS and UV codes differ from each other, or if no counter value and CS code has been received from the UCS 3 during the TSU cycle, a termination event has occurred and the method proceeds to step S8.

Step S8 is a step allowing the termination system 1 to be adjusted to varying degrees of sensitivity. Typically, one does not want the UAV 5 to self-terminate upon the occurrence of a single termination event, such as a mismatch between the CS and UV codes in a single TSU cycle. To prevent the UAV 5 from being terminated due to for example a temporary interruption in the communication between the UCS 3 and the UAV 5, a transient disturbance that temporarily affects the communication between the UAV computer 15 and the TED 31, etc., one or several termination conditions should be fulfilled in step S8 in order for the UAV 5 to be terminated. An example of a termination condition that has to be fulfilled in order for the UAV 5 to self-terminate can be that a termination event, or the same termination event, should have occurred during a certain number of consecutive TSU cycles. This functionality can be implemented by adapting either the UAV computer 15 or the TED 31 to calculate the number of termination events occurring in consecutive TSU cycles, and design the termination system 1 such that the UAV 5 is not terminated until said number exceeds a predetermined threshold value. For example, the code verification function 29 can be adapted to send a termination command to the TED 31 as soon as a termination event occurs, in which case the TED can be adapted to count the number of consecutive TSU cycles in which it has received a termination command from the UAV computer 15, and to terminate the UAV 5 when said number exceeds the threshold value. Or, the code verification function 29 can be adapted to count the number of consecutive TSU cycles in which a termination event occurs, and send a termination command to the TED 31 when said number exceeds the threshold value, in which case the TED 31 can be adapted to terminate the UAV 5 immediately upon reception of a termination command. For example, the threshold value can be set to 50, corresponding to a time period of 5 seconds if the termination system update frequency is 10 Hz. By increasing/decreasing the threshold value, the sensitivity of the termination system 1 can be easily decreased/increased. An example of another condition that alone or in combination with the above condition has to be fulfilled in order for the UAV 5 to self-terminate can be that the UAV 5 has to be located close to the boarder of its permitted operational area. In this case, of course, the UAV computer 15 must have knowledge not only of the geographical extension of its permitted operational area, but also of its own position. If the termination condition(s) is fulfilled in step S8, the method proceeds to step S9. Otherwise it returns to step S7 in which it ends.

In step S9, the TED 31 terminates the UAV 5 by, e.g., switching off the UAV engine ignition or quenching the fuel supply to the UAV engine.

The above described method for UAV termination decision-making ensures that the UAV 5 is terminated when an operator manually activates the termination actuator 13, or when any components 7, 11 of the UCS 3 which are vital to the possibility of manually terminating the UAV 5 start malfunctioning, both scenarios resulting in the inability of the UCS 3 to provide the UAV 5 with a valid counter value/CS code pair in step S3.

Preferably, in order to add a first extra level of security to the UAV termination system 1, the UAV termination function 19 may be further adapted to ensure that the UAV is terminated unless there is a continuous change in the counter values and/or the CS codes received from the UCS computer 7. This is advantageous in that it makes the system 1 less prone to infinite loops and third-party UAV takeover attempts. If the UAV termination function 19 should get stuck in an infinite loop providing the same CS and UV codes as input parameters to the code verification function 29 over and over again, there is a risk that manual termination of the UAV 5 from the UCS 3 would not be possible. Also, if a third party eavesdropping on the communication link between the UCS 3 and the UAV 5 with malicious intent was able to get hold of a valid counter value/CS code pair, the third party may be able to prohibit termination of the UAV 5 from the UCS 3 by repeatedly transmitting this sole counter value/CS code pair to the UAV 5. This functionality can be implemented by, at least temporarily, storing the received counter values in a memory in the UAV computer 15, and adapt the code verification function 29 to, after having establish that a currently received CS code equals a UV code generated from the currently received counter code, compare the currently received counter value with the previously received counter value or values. Since a particular counter value always should result in the same code when run through the UCS and UAV termination algorithms 27A, 27B, a change in either the counter value parameter or the CS code parameter of a received counter value/CS code pair implies that there is a change in both parameters if the system 1 operates correctly. If there is a change in only one of the parameters between two consecutively received counter value/CS code pairs, at least one of the pairs is invalid and will cause termination of the UAV as described above. Thus, when implementing this functionality, it is sufficient to adapt the UAV termination function 19 to check whether there is a continuous change in either the counter values or the received CS codes (or the generated UV codes).

Figure 3:
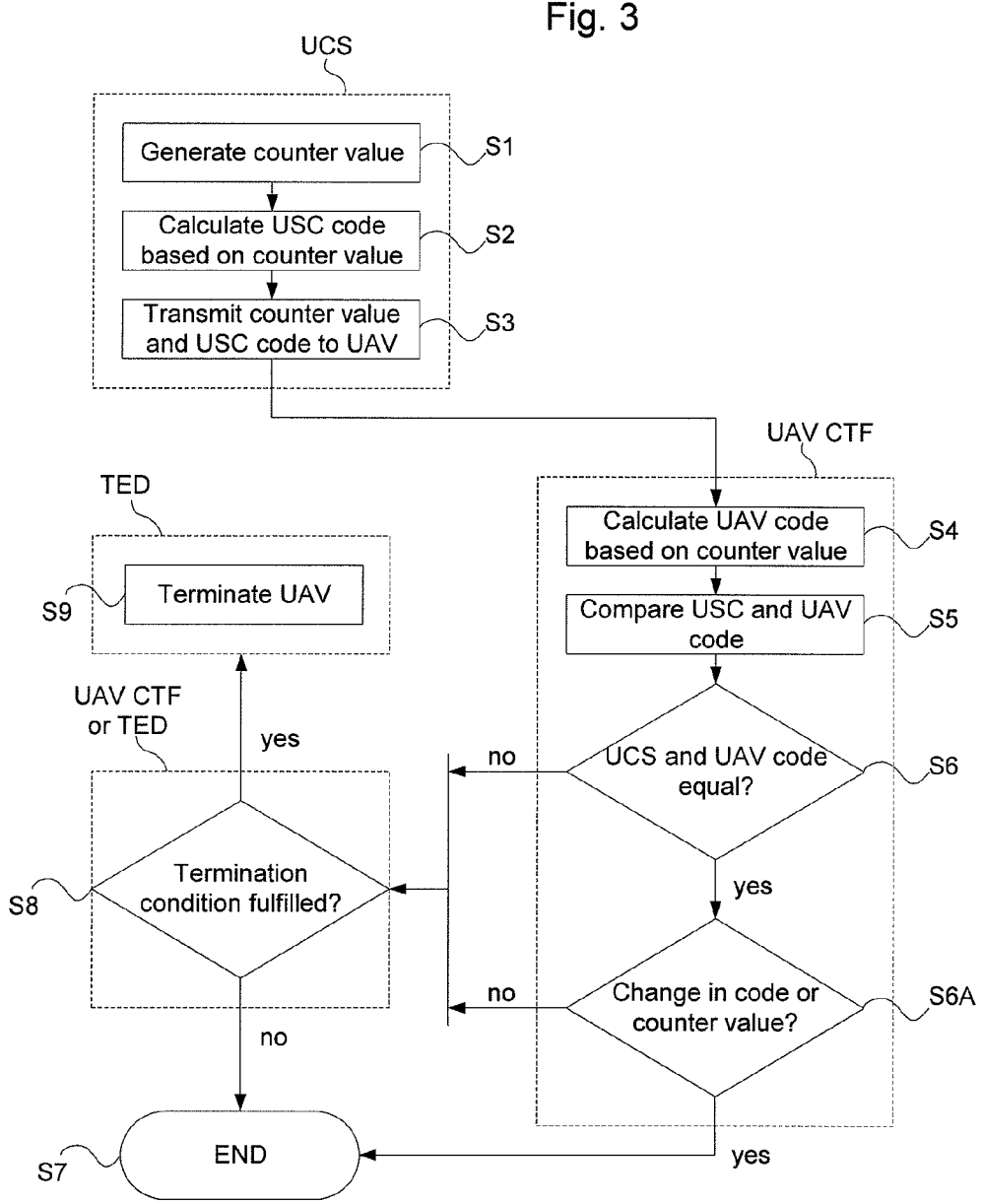
FIG. 3 shows a flow chart illustrating a refined method according to the invention for determining whether a UAV should be terminated or not.

FIG. 3 shows a flow chart illustrating a refined method according to the invention for determining whether a UAV should be terminated or not. The method illustrated in FIG. 3 differs from that illustrated in FIG. 2 only in that an extra step S6A is added after step S6, which extra step provides for the above described first extra level of security.

If, in step S6, the UAV termination function 19 establishes that a received CS code generated from a particular counter value is equal to a UV code generated from the same counter value, the method proceeds to new step S6A. If the CS code differs from the UV code, the received counter value/CS code is considered invalid and the method proceeds to step S8 as described above.

In step S6A, the UAV termination function 19 compares any of the counter value parameter, the CS code parameter, or the UV code parameter with one or several previously received parameters of the same type to ensure that there is a continuous change in the parameter value. If there is a change in parameter value, the method ends in step S7. If there is no change in the parameter value, i.e. if the parameter remains unchanged between the cycles, the UAV termination system 1 does not function correctly and the method proceeds to step S8 to see whether or not the currently detected termination event of an unchanged parameter value should result in termination of the UAV 5 according to the termination condition(s). The type of termination event corresponding to a non-change in the counter value parameter, the CS code parameter, or the UV code parameter between consecutive TSU cycles is herein called constant parameter termination event. As mentioned above, this first extra level of security can be implemented by storing, at least temporarily, the received counter values in a UAV computer memory. When a subsequent counter value/CS code pair is received, the previously received counter value is recalled from the memory and compared to the subsequently received counter value.

Figure 4:
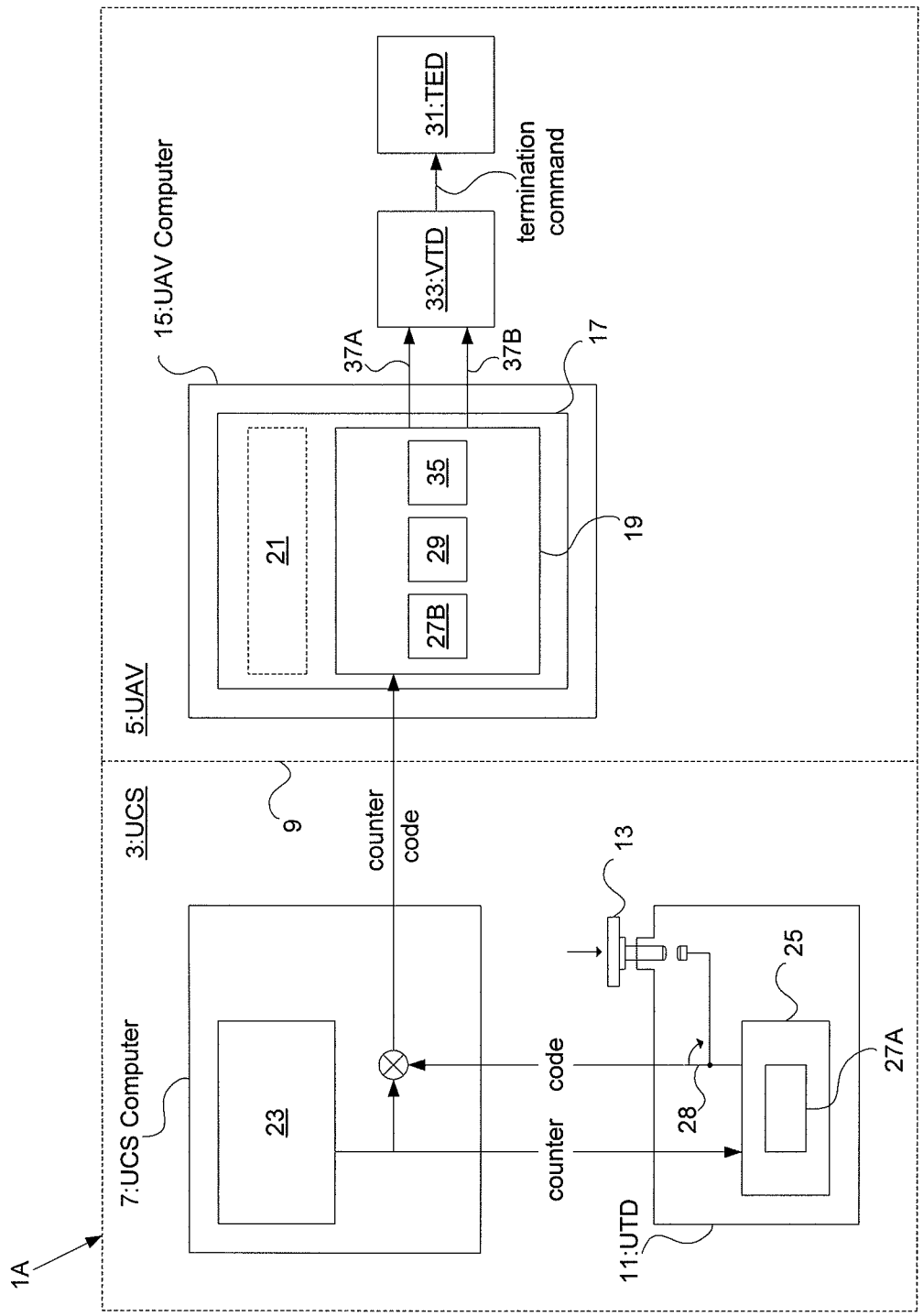
FIG. 4 illustrates a second embodiment of a UAV termination system for remote termination of UAVs according to the invention.

FIG. 4 illustrates an embodiment of a UAV termination system 1A for remote termination of UAVs according to the invention, in which the UAV 5 comprises means to add a second extra level of security to the UAV termination system 1A.

The UAV termination system 1A in FIG. 4 differs from that illustrated in FIG. 1 in that the UAV 5 comprises a vehicle termination device (VTD) 33, and in that the UAV termination function 19, besides the termination algorithm 27B and the code verification function 29, further includes a termination function (TF) test function 35. The VTD 33 is a standalone unit, external to the UAV computer 15, interconnecting the UAV computer 15 and the TED 31. It is the VTD 33 and the TF test function 35 which together provide for the second extra level of security of the UAV termination system 1A.

The TF test function 35 is executed each time the code verification function 29 has verified that a received counter value/CS code pair is valid, i.e. that a received CS code and a UV code generated from the same counter value are equal, and additionally also that there is a change in the counter and/or code values as compared to previously received/generated counter and code values. When the TF test function 35 is executed, it is adapted to generate two synchronous square wave signals having the same frequency but shifted to be 180 degrees out of phase with each other, and transmit the two square waves to the VTD 33 via two separate and independent signalling paths 37A, 37B. The VTD 33 is in turn adapted to compare the received square waves and determine whether they fulfil certain termination function (TF) test conditions. In this exemplary embodiment, the TF test conditions are that the signals received over the two signalling paths 37A, 37B shall be two simultaneously received square waves having the same frequency but being phase shifted 180 degrees in relation to each other, thereby cancelling each other out. If the TF test conditions are fulfilled, no further actions are taken by the VTD 33. If the TF test conditions are not fulfilled during one or a plurality of consecutive TSU cycles, the VTD 33 sends a UAV termination command to the TED 31. That the TF test conditions are not fulfilled during a TSU cycle indicates that no signal or erroneous signals are transmitted from the TF test function 35 to the VTD 33 during that cycle, which in turn indicates either that the termination function 19 did not receive any counter value/CS code pair from the UCS 3 during that cycle, or that the termination function 19 malfunctions. Valid signals, i.e. signals fulfilling the TF test conditions, generated by the TF test function 35 and transmitted from the UAV computer 15 to the VTD 33 each TSU cycle hence serve as "do-not-terminate commands" which prevents the VTD 33 from sending termination commands to the TED 31.

An advantage of the second extra layer of security provided by the TF test function 35 and the VTD 33 is that the UAV 5 is terminated also in case of UAV computer malfunction. If the UAV computer 15, or at least the termination function 19 of the UAV computer, starts malfunctioning, the VTD 33 will not receive signals fulfilling the TF test conditions, causing automatic termination of the UAV. Thus, the second extra layer of security ensures that the there is no risk that a UAV operator will end up in a situation in which manual termination of the UAV 5 is impossible due to UAV computer malfunction.

It should be understood that the generation of two synchronous square wave signals is merely an example of a suitable result of the execution of the TF test function 35. The TF test function 35 can, upon execution thereof, be adapted to generate any signal or signals of which characteristics or information content is non-trivial and verifiable by the VTD 33. "Non-trivial" here means that the signal(s) should have characteristics or carry information that is sufficiently complex to make it extremely unlikely that a random process in the UAV computer 15 would generate such a signal or signals by chance. Thereby, a signal fulfilling the TF test conditions in the VTD 33 is truly indicative of that at least the TF test function 35 of the termination function 19 has been successfully executed by the UAV computer 15.

Another advantage obtained through the introduction of the VTD 33 is that no components of the termination system 1A besides the VTD 33 itself need to be classified to a very high criticality level. When developing airborne systems equipment software, it is common to practise a standard known as RTCA/DO-178B. The standard requires systems to be classified as to criticality level. The standard requires that a system that may cause or contribute to a malfunction of a certain degree of seriousness must be developed according to certain rules. Software is classified in five levels, A to E, where A corresponds the most critical one, and E the least critical level. Software must be developed according to class A if a software error may lead to a crash with casualties, to class B if the error may lead to extensive personal injuries or severely reduced safety levels, and further levels C, D, E corresponding to less severe effects of an error. Software classified as type A, B or C is expensive to develop and is in principle not allowed to be integrated or executed on a commercial computer using commercial-off-the-shelf software (COTS software) such as Windows or Linux operating systems. As the scenario of a UAV escaping from its permitted operational areas (scenario "UAV escape") may lead to a crash with casualties and/or extensive personal injuries, all software components within an information chain allowing a UAV to be remotely terminated have traditionally been developed to class A or B. Another standard called RTCA/DO-254 requires complex electronic circuits to be classified as to criticality level in a similar way. Just like RTCA/DO-178B, RTCA/DO-254 uses 5 levels, A to E, where A corresponds the most critical level, and E the least critical level. As is the case with software components, electronic circuit components in safety-critical systems, such as systems for avoiding UAV escape scenarios, have traditionally been developed to the highest criticality levels, thus making such systems extremely expensive to develop as there is a clear correspondence between the criticality level of an electronic circuit and its cost. The proposed solution, however, only requires software and/or electronic circuit components of the VTD 33 to be classified to the highest criticality levels as it is only malfunction of the VTD 33 that could lead to a situation in which the UAV 5 cannot be terminated. The proposed termination system design hence allows both the UCS computer 7 and the UAV computer 15 to be conventional off-the-shelf-computers running COTS software, thereby greatly reducing the cost of the termination system 1A.

The VTD 33 can be implemented in hardware, software or any combination of these. For example, the VTD 33 can be realized as a Field-Programmable Gate Array (FPGA), a microprocessor running software developed according to a very high criticality level, or by using simple discrete electronics.

Figure 5:
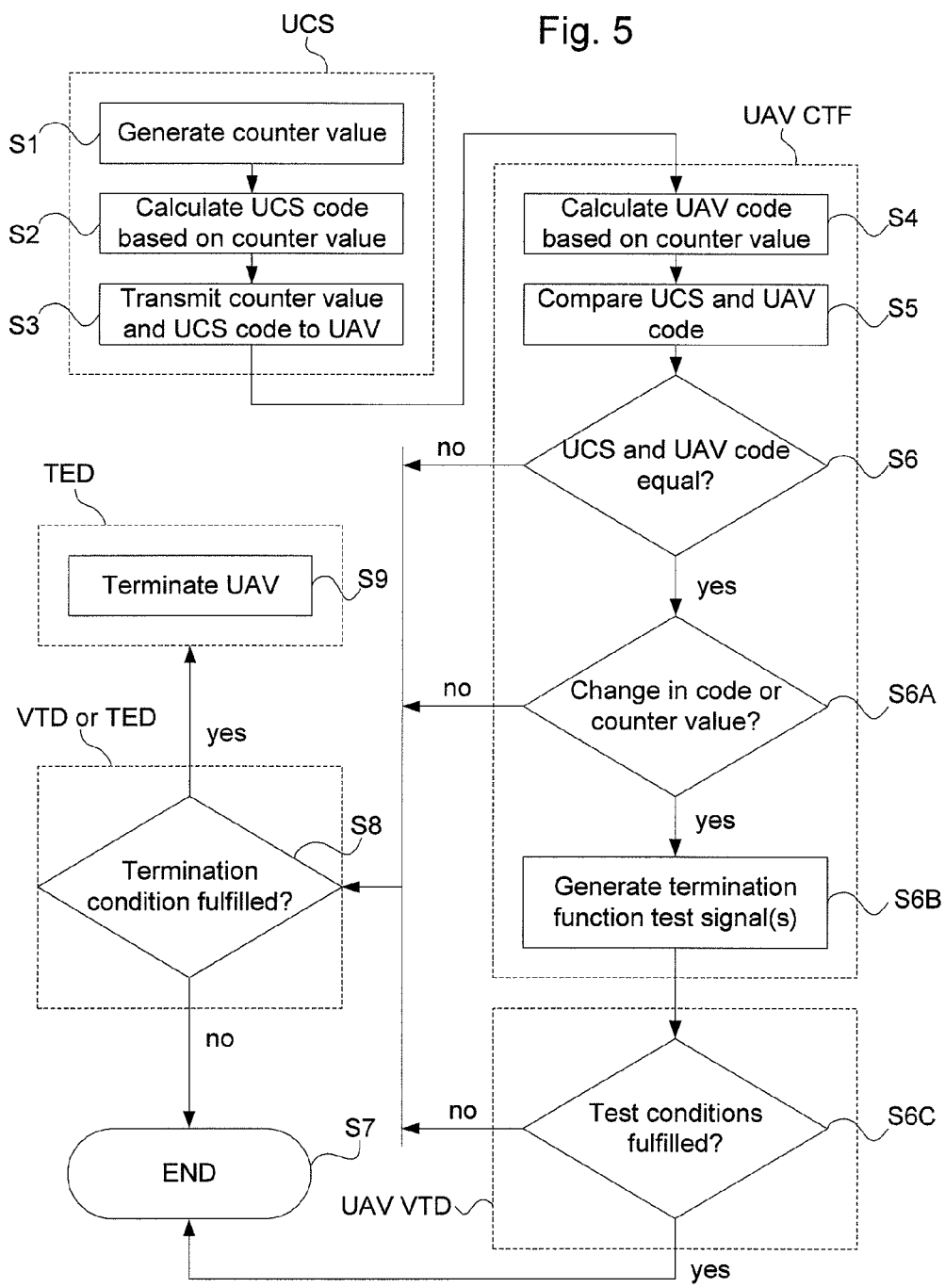
FIG. 5 shows a flow chart illustrating a further refined method according to the invention for determining whether a UAV should be terminated or not.

FIG. 5 shows a flow chart illustrating a further refined method according to the invention for determining whether a UAV should be terminated or not. The method illustrated in FIG. 5 differs from that illustrated in FIG. 3 in that two extra steps S6B and S6C are added after step S6A, which extra steps provide for the above described second extra level of security.

If, in step S6, the UAV termination function 19 establishes that a received CS code generated from a particular counter value is equal to a UV code generated from the same counter value, the method proceeds, either directly or, optionally, via step S6A previously described above with reference to FIG. 3, to step S6B. If the CS code differs from the UV code, a code termination event has occurred whereupon the method proceeds to step S8.

In step S6B, a TF test function 35 of the UAV computer 15 generates one or several signals which are transmitted to the UAV VTD 33 which, in turn, analyzes the received signals to see whether they fulfil one or several predefined non-trivial TF test conditions. As aforementioned, an example of non-trivial TF test conditions which must be fulfilled by the TF test function 35 can be to generate two synchronous square waves having the same frequency but shifted to be 180 degrees out of phase with each other, and transmit the two square waves to the VTD 33 via two separate and independent signalling paths 37A, 37B. Another example of non-trivial TF test conditions for the TF test function 35 to fulfil could be to generate one sine wave signal, one triangular signal and one square signal having certain frequencies, and transmit them to the VTD 33 via one or several signal paths. If the VTD 33 can establish that the TF test conditions are fulfilled by the TF test function 35, the method ends in step S7. If the TF test conditions are not fulfilled due to termination system malfunction or operator-initiated termination of the UAV, a termination event has occurred and the method proceeds to step S8. The type of termination event occurring when the VTD 33 has not received signal(s) fulfilling the TF test conditions during a TSU cycle is herein called TF test termination event.

In accordance with the flow chart illustrated in FIG. 2, step S8 is a step allowing the termination system 1A to be adjusted to varying degrees of sensitivity by stating one or several termination conditions that must be satisfied before allowing the UAV 5 to self-terminate. A typical example of such a condition can be that a termination event, or the same termination event, should have occurred for at least a certain number of consecutive TSU cycles. In that way, the UAV 5 is prevented from being terminated due to for example a temporary interruption in the communication between the UCS 3 and the UAV 5, or a transient disturbance that temporarily interrupts the communication between the UAV computer 15 and the VTD 33, or between the VTD 33 and the TED 31. This functionality can, in this embodiment, be implemented by adapting the VTD 33 to calculate the number of consecutive TSU cycles in which a TF test termination event has occurred (i.e. cycles in which the VTD does not receive signals fulfilling the TF test conditions from the UAV computer 15), and to send a termination command to the TED 31 when said number exceeds a predetermined threshold value. Another way to implement the same functionality is to adapt the VTD 33 to send a termination command to the TED 31 each time a TF test termination event occurs and to adapt the TED 31 to count the number of consecutive TSU cycles in which it has received a termination command from the VTD, and to terminate the UAV 5 when said number exceeds the threshold value. It should be noted that, in the embodiment of the termination system 1A illustrated in FIG. 4, no termination command is sent to the TED 31 upon detection of a code or constant parameter termination event. Instead, the occurrence of any such termination event will result in that the TF test function 35 is not executed, and hence that no TF test signals fulfilling the TF test conditions in the VTD 31 are generated. That is, any occurrence of a code or constant parameter termination event will result in a TF test termination event, which in turn may result in the transmission of a termination command to the TED 31 in case the termination conditions are fulfilled.

Figure 6:
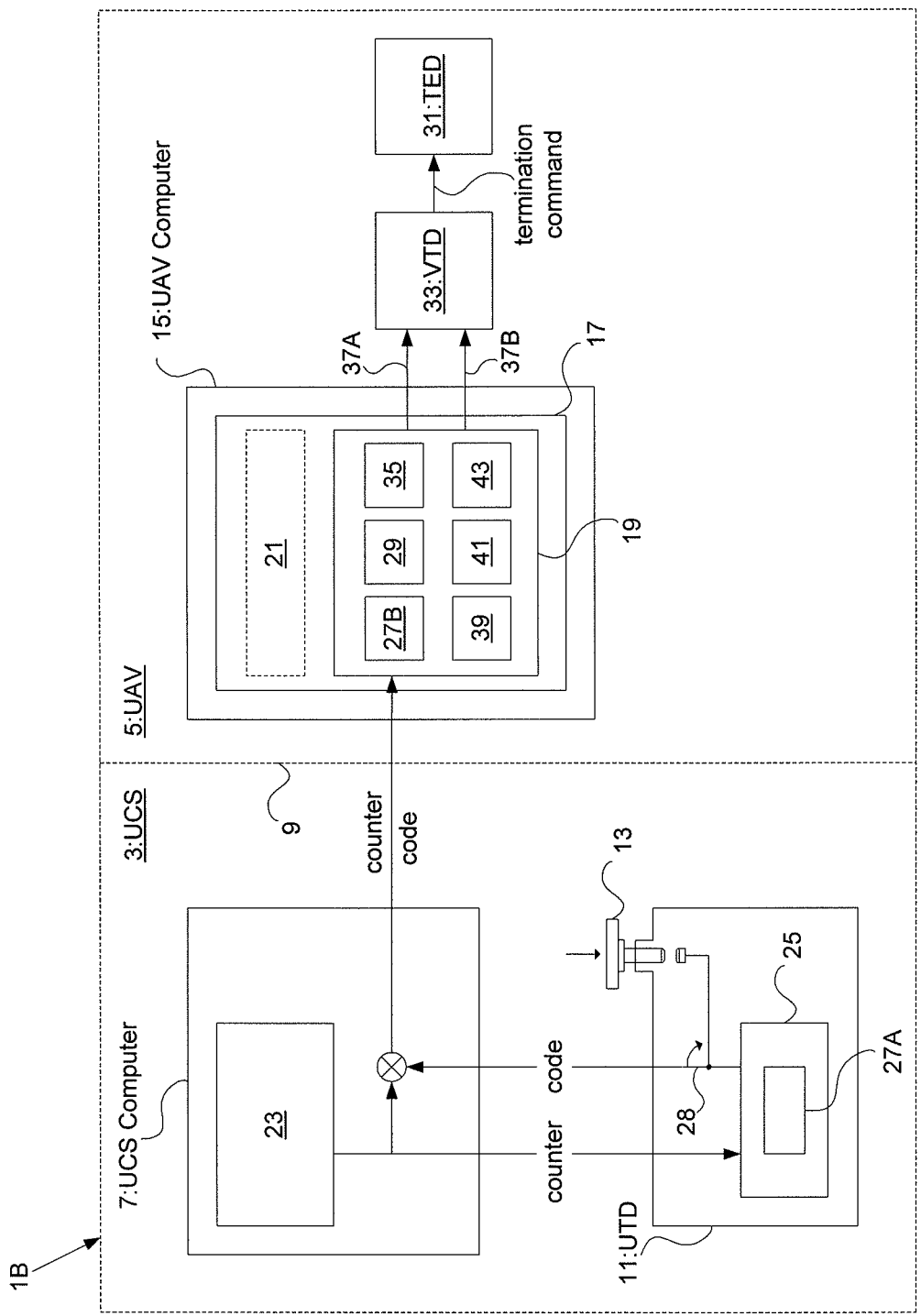
FIG. 6 illustrates a third embodiment of a UAV termination system for remote termination of UAVs according to the invention.

FIG. 6 illustrates an embodiment of a UAV termination system 1B for remote termination of UAVs according to the invention, in which the UAV 5 comprises means to add a third extra level of security to the UAV termination system 1B.

The UAV termination system 1B in FIG. 6 differs from that illustrated in FIG. 4 in that the termination function 19 of the UAV computer 15, besides the termination algorithm 27B, the code verification function 29 and the TF test function 35 further includes an interruption avoidance function 39, a full execution control function 41, and a data integrity function 43.

Figure 7:
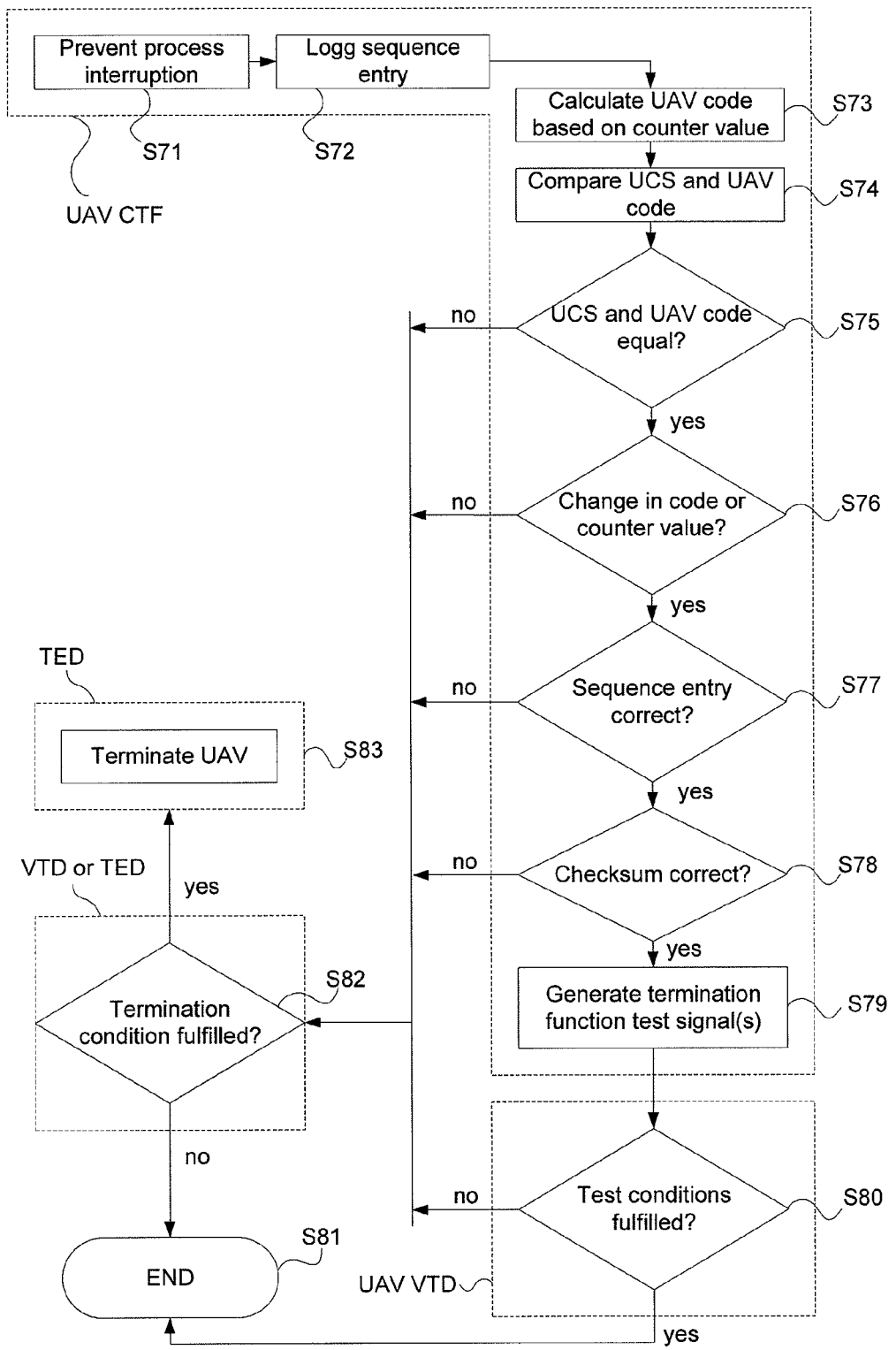
FIG. 7 shows a sequence diagram illustrating the sequence of actions performed in a UAV receiving a counter value/CS code pair from a UAV control station (UCS) in the termination system illustrated in FIG. 6.

The interruption avoidance function 39, the full execution control function 41 and the data integrity function 43 will now be described with reference to FIG. 7 which shows a sequence diagram illustrating the sequence of actions performed in the UAV 5 each TSU cycle.

When the termination function 19 in the UAV computer 15 receives a counter value/CS code pair as input parameters from the UCS 3, the interruption avoidance function 39 is executed. This occurs in step S71. The interruption avoidance function 39 serves to set the processor 17 of the UAV computer 15 in a mode in which it ignores incoming calls, i.e. interrupt requests, until it is has caused the termination function 19 to carry out all the steps S72 to S79. In that way, the processor is prohibited from interrupting the termination function 19 until it is fully executed, thereby avoiding accidental termination of the UAV 5 due to data processing interruption. Even more importantly, other software processes are prevented from interrupting the termination function 19 and thereby potentially preventing manual termination of the UAV 5 if requested from the UCS 3. As the skilled person will understand, the interruption avoidance function 39 can, for example, be implemented as program code instructing an internal interrupt mask of the processor 17 or an interrupt mask register (IMR) of a programmable interrupt controller (PIC) or an advanced programmable interrupt controller (APIC) to ignore all incoming interrupt requests, thus making execution of the termination function 19 a protected mode of operation.

In step S72, the full execution control function 41 logs into a termination function execution log that entry into the termination function 19 has been done through the correct entry point for this function. The sequence then proceeds to step S73.

Steps S73, S74, S75 and S76 correspond to the steps S4, S5, S6, S6A in FIGS. 2, 3 and 5 and need not to be described again. If no manual termination of the UAV and no system malfunction has occurred, the code verification function 29 of the termination function 19 will, in these steps, establish that the UV code generated from the received counter value equals the received CS code and, additionally, that there is a change in the code or counter value as compared to previous loops, whereupon the process will proceed to step S77.

In step S77, the full execution control function 41 turns to the execution log to see whether there is a log record indicating that entry into the termination function 19 has been done through the correct entry point, i.e. whether or not step S72 has been performed. If no log record indicating that entry into the termination function has been done through the correct entry point is found, a termination event of a type herein called TF entry termination event has occurred, and the sequence proceeds to step S82 (corresponding to step S8 in FIGS. 2, 3 and 5). If, on the other hand, a log record indicating that entry into the termination function has been done through the correct entry point is found, the sequence proceeds to step S78. That a log record is found indicates that the termination function has been properly executed from the beginning and hence that a counter value/CS code pair received from the UCS 3 has been successfully validated by the code verification function 29 through steps S73 to S76. That no log record is found indicates that the termination function 19 has not been executed from the beginning and that there is a risk that some or all of the critical steps preceding step S77 has not been carried out.

In step S78, the data integrity function 43 performs a redundancy check of the data variables used by the termination function 19 in order to establish whether the data have been subject to inadvertent modification. Typically, the redundancy check is performed using a checksum which is a well-known and simple way to protect the integrity of data. When the data integrity function 43 is implemented as a checksum function, the checksum of the data variables used by the termination function 19 is, for each TSU cycle, computed according to a checksum algorithm, and stored, at least temporarily, in a data storage. For each TSU cycle, the data integrity function 43 compares the currently computed checksum to the stored checksum that was computed during the previous TSU cycle to see whether the currently processed data has been inadvertently modified by another process in the UAV computer 15. If the redundancy check is successful, meaning that the checksum computed in the current TSU cycle corresponds to the checksum computed in the previous TSU cycle, it is assumed that the data have not been corrupted and the sequence proceeds to step S79. If the redundancy check is unsuccessful, meaning that the checksums differ from each other, a termination event of a type herein called data corruption termination event has occurred, and the sequence proceeds to step S82. It should be noted that the type of redundancy check used by the data integrity function 43 can be any data redundancy check known in the art. For example, it can be Fletcher's checksum, a cyclic redundancy check, or Adler-32, which all are examples of redundancy checks that are well suited for detecting accidental modifications of data. However, it can also be a more advanced type of redundancy check, such as a redundancy check employing a cryptographic hash function, for providing security also against more sophisticated malicious attempts to modify the data used by the termination function 19. Alternatively an error correcting function may be used which allows the termination function to restore any corrupted data, in which case UAV termination is only used as a last resort if it turns out that restoration of data is impossible.

Steps S79 to S83 correspond to the steps S6B, S6C, S7, S8 and S9 in FIGS. 2, 3 and 5 and need not to be described again.

The interruption avoidance function 39, the full execution control function 41, and the data integrity function 43 thus provides a third extra level of security to the UAV termination system 1B which ensures that the termination function 19 is not interrupted during execution, that the termination function 19 is always executed in its entirety, and that the integrity of the data used by the termination function 19 is protected from undetected corruption. A signal which is generated by the TF test function in step 79 and found to fulfil the TF test conditions in step S80 is hence truly indicative of that the entire termination function 19 has been completely and successfully executed by the UAV computer 15. The interruption avoidance function 39, the full execution control function 41, and the data integrity function 43 serve to make the termination function 19 an easily realizable and securely partitioned software module, thus saving cost compared to realizing the termination function 19 in safety-critical software and/or hardware.

Although the interruption avoidance function 39, the full execution control function 41, and the data integrity function 43 have been described as a group of functions providing the functionality herein referred to as the third extra level of security, it should be understood that the different functions 39, 41, 43 can be used alone or in any combination in order to increase the security of the termination systems 1, 1A illustrated in FIGS. 1 and 4.

Furthermore, it should be noted that the functionality incorporating the first, second and third extra levels of security described above can be combined in any way. For example, the embodiments illustrated in FIG. 1 and FIG. 6 can be combined such that a UAV termination system according to the invention comprises a termination function 19 which includes an interruption avoidance function 39 and a data integrity function 43, but no TF test function 35 or VTD 33.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

It is therefore contemplated that the claims will cover any such modifications or embodiments that fall within the true scope of the invention.

The invention claimed is:

1. A termination system for remote termination of an unmanned vehicle communicatively connected to an unmanned vehicle control station via an air interface, said termination system comprising:
   one control station portion located in said control station comprising
   a control station computer comprising a counter value generator adapted to generate, on a cyclic basis, different counter values;
   a termination device adapted to generate, in each cycle, a control station code by running a counter value through a termination algorithm;
   a transmitter adapted to transmit, in each cycle, the counter value and the control station code generated from the counter value to the unmanned vehicle in form of a counter value/control station code pair, via said air interface, and
   a termination actuator which, when actuated, is adapted to prevent counter value/control station code pairs in which the control station code has been generated from the counter value from being transmitted to the unmanned vehicle, and
   a vehicle portion comprising
   a receiver adapted to receive the counter value/control station code pair transmitted from the control station in each cycle; and
   an unmanned vehicle computer connected to said receiver and adapted to:
   generate an unmanned vehicle code by running the counter value in the received counter value/control station code pair through a termination algorithm corresponding to the algorithm used to generate the control station code in the control station, and
   compare the control station code in the received counter value/control station code pair with said generated unmanned vehicle code to establish whether the counter value/control station code pair and the generated unmanned vehicle code differ from each other, in which case a termination event of the type code termination event has occurred, and
   a termination decision unit configured to decide whether or not to terminate the unmanned vehicle based on the occurrence of any termination events, wherein the termination decision unit is further configured to effectuate termination of the unmanned vehicle if no counter value/control station code pair has been received by the receiver in at least one consecutive cycle.

2. The termination system according to claim 1, wherein the termination device is a stand-alone unit externally connected to the control station computer, said termination device being adapted to receive the counter values from the control station computer, run them through the termination algorithm, and return a control station code for each counter value to the control station computer, said termination actuator being adapted to, when actuated, disconnect the termination device from the control station computer such that the counter values cannot be received by the termination device and/or the control station codes cannot be returned to the control station computer by the termination device, thereby preventing counter value/control station code pairs in which the control station code has been generated from the counter value from being transmitted to the unmanned vehicle.

3. The termination system according to claim 1, wherein the unmanned vehicle computer is further adapted to, for each cycle:
   store, at least temporarily, any of the counter value parameter, the control station code parameter, or the unmanned vehicle code parameter; and
   compare any of said parameters with at least one parameter of the same type, stored during at least one previous cycle, to see whether the parameter remains unchanged between the cycles, in which case a termination event of the type constant parameter termination event has occurred.

4. The termination system according to claim 1, wherein the vehicle portion of the termination system further comprises a vehicle termination device which is externally connected to the unmanned vehicle computer, said unmanned vehicle computer being further adapted to, for each cycle in which no termination event has occurred:
   generate a do-not-terminate command in form of one or several signals having predetermined characteristics or carrying predetermined information content, which characteristics or information content is sufficiently complex for making unlikely that a random process in the unmanned vehicle computer would generate such a signal or signals by chance, and
   transmit said signal(s) to said vehicle termination device, the vehicle termination device in turn being adapted to, for each cycle:
   establish whether the vehicle termination device has not received signal(s) from the unmanned vehicle computer having said predetermined characteristics or carrying said predetermined information content, in which case a termination event of the type termination function test termination event has occurred.

5. The termination system according to claim 1, wherein the sequence of actions performed by the unmanned vehicle computer is performed by the execution of a termination function, said termination function includes:
   an interruption avoidance function adapted to set the computer processor responsible for the execution of the termination function in a mode in which the computer processor ignores incoming interrupt requests from other software/hardware while executing the termination function;
   a full execution control function adapted to detect if entry into the termination function has not been done through the correct entry point, in which case a termination event of the type termination function entry termination event has occurred, and a data integrity function adapted to detect if data processed by the termination function has been inadvertently modified by any other process in the unmanned vehicle computer, in which case a termination event of the type data corruption termination event has occurred.

6. The termination system according to claim 1, wherein said termination decision unit is adapted to determine the number of consecutive cycles in which any type of termination event has occurred, and, if said number exceeds a predetermined threshold value, instruct a termination execution device of the unmanned vehicle to terminate the vehicle.

7. The termination system according to claim 6, wherein the unmanned vehicle is terminated by switching of the vehicle engine ignition or quenching the fuel supply to the vehicle engine.

8. An unmanned vehicle control station from which an unmanned vehicle communicatively connected to said control station via an air interface can be terminated remotely, said control station comprising:
a control station computer comprising a counter value generator adapted to generate, on a cyclic basis, different counter values;
a termination device adapted to generate, in each cycle, a control station code by running a counter value through a termination algorithm;
a transmitter adapted to transmit, in each cycle, the counter value and the control station code generated from that counter value to the unmanned vehicle in form of a counter value/control station code pair, via said air interface, and
a termination actuator which, when actuated, is adapted to prevent counter value/control station code pairs in which the control station code has been generated from the counter value from being transmitted to the unmanned vehicle,
wherein the unmanned vehicle is adapted to self-terminate if no counter value/control station code pair is received in at least one consecutive cycle, and wherein the cyclic transmission of the counter value/control station code pairs by the control station serves as transmission of do-not-terminate commands to the unmanned vehicle, instructing the unmanned vehicle not to self-terminate.

9. An unmanned vehicle being communicatively connected to an unmanned vehicle control station via an air interface from which the vehicle can be terminated remotely, said unmanned vehicle comprising:
a receiver adapted to receive counter values and control station codes cyclically transmitted in form of counter value/control station code pairs from said control station, the control station code in each pair being generated by running the counter value in that pair through a termination algorithm; and
an unmanned vehicle computer connected to said receiver and adapted to, for each cycle:
generate an unmanned vehicle code by running the counter value through a termination algorithm corresponding to the termination algorithm through which the counter value was run to generate the control station code;
compare said received control station code with said generated unmanned vehicle code to establish whether they differ from each other, in which case a termination event of the type code termination event has occurred, and
termination decision unit adapted to decide whether or not to terminate the unmanned vehicle based on the occurrence of any termination events,
wherein the termination decision unit is further adapted to effectuate termination of the unmanned vehicle if no counter value/control station code pair has been received by the receiver in at least one consecutive cycle.

10. A method for deciding whether an unmanned vehicle that is communicatively connected to an unmanned vehicle control station via an air interface should be terminated or not, based on the occurrence of one or a plurality of termination events being one of at least one termination event types, the method comprising:
generating mutually dependent code and counter values by performing, on a cyclic basis, the following in the control station:
generating with a control station computer a counter value;
generating with the control station computer a control station code by running said counter value through a termination algorithm; and
transmitting, with a transmitter, over the air interface, said counter value and said control station code to the unmanned vehicle;
and deciding whether or not to terminate the vehicle based on information received over the air interface by performing, for each cycle, the following in the unmanned vehicle:
receiving with a receiver said counter value and said control station code;
generating with an unmanned vehicle computer an unmanned vehicle code by running said received counter value through a termination algorithm corresponding to the termination algorithm used to generate the control station code in the control station;
comparing with the unmanned vehicle computer said received control station code with said generated unmanned vehicle code to establish whether they differ from each other, in which case a termination event of the type code termination event has occurred; and
deciding whether or not to terminate the unmanned vehicle based on the occurrence of any termination events;
terminating, with the unmanned vehicle computer, the unmanned vehicle if no counter value/control station code pair has been received in the unmanned vehicle in at least one consecutive cycle.

11. The method according to claim 10, wherein the method further includes performing, for each cycle, the following in the unmanned vehicle:
storing, with the unmanned vehicle computer, at least temporarily, any of the counter value parameter, the control station code parameter, or the unmanned vehicle code parameter;
comparing, with the unmanned vehicle computer, any of said parameters with at least one parameter of the same type, stored during at least one previous cycle, to establish whether they do not differ from each other, in which case a termination event of the type constant parameter termination event has occurred.

12. The method according to claim 10, further comprises performing, with said unmanned vehicle computer, for each cycle in which no termination event has occurred, the following in said computer:
generating a do-not-terminate command in form of at least one signal having predetermined characteristics or carrying predetermined information content, which characteristics or information content is sufficiently complex for making unlikely that a random process in the unmanned vehicle computer would generate said at least one signal by chance;

transmitting said at least one signal to a vehicle termination device, externally connected to the unmanned vehicle computer, the method further includes performing, for each cycle, the following in said vehicle termination device;

establishing whether said vehicle termination device has not received said at least one signal from the unmanned vehicle computer having said predetermined characteristics or carrying said predetermined information content, in which case a termination event of the type termination function test termination event has occurred.

13. The method according to claim 10, further comprising:
if a manually activated termination actuator is actuated in the control station, preventing counter value/control station code pairs in which the control station code has been generated from the counter value from being transmitted to the unmanned vehicle, thereby intentionally causing one or several termination events to occur.

14. The method according to claim 10, wherein deciding whether or not to terminate the unmanned vehicle based on the occurrence of any termination events comprises:

determining, with the unmanned vehicle computer, the number of consecutive cycles in which any type of termination event has occurred; and deciding, with the unmanned vehicle computer, to terminate the unmanned vehicle if said number exceeds a predetermined threshold value.

* * * * *